(12) United States Patent
Slater et al.

(10) Patent No.: US 9,156,256 B2
(45) Date of Patent: Oct. 13, 2015

(54) PRINTING PROCESS AND LIQUID INK JET INK

(75) Inventors: Sean Dennis Slater, Royston (GB); Andrew John Clippingdale, Royston (GB); Guy Charles Fernley Newcombe, Royston (GB)

(73) Assignee: TONEJET LIMITED, Royston, Hertfordshire (GB)

( * ) Notice: Subject to any disclaimer, the term of this patent is extended or adjusted under 35 U.S.C. 154(b) by 384 days.

(21) Appl. No.: 13/261,214

(22) PCT Filed: Sep. 14, 2010

(86) PCT No.: PCT/EP2010/063472
§ 371 (c)(1),
(2), (4) Date: May 10, 2012

(87) PCT Pub. No.: WO2011/032939
PCT Pub. Date: Mar. 24, 2011

(65) Prior Publication Data
US 2012/0218362 A1    Aug. 30, 2012

(30) Foreign Application Priority Data
Sep. 15, 2009   (EP) ..................... 09170296

(51) Int. Cl.
*B41J 2/06*      (2006.01)
*C09D 11/322*    (2014.01)
*C09D 11/40*     (2014.01)
(52) U.S. Cl.
CPC ................. *B41J 2/06* (2013.01); *C09D 11/322* (2013.01); *C09D 11/40* (2013.01)

(58) Field of Classification Search
CPC ...................................... C09D 11/322
USPC ................................... 347/112, 102
See application file for complete search history.

(56) References Cited

U.S. PATENT DOCUMENTS 3,542,682 A * 11/1970 Mutaffis .................. 430/115
4,165,399 A    8/1979 Germonprez
(Continued)

FOREIGN PATENT DOCUMENTS

EP    1491331    12/2004
EP    1520884    4/2005
(Continued)

OTHER PUBLICATIONS

Examination Report, dated Aug. 27, 2014, in related EP Application No. 10755134.3.

*Primary Examiner* — Sarah Al Hashimi
(74) *Attorney, Agent, or Firm* — Dickinson Wright PLLC (57) ABSTRACT

A process for forming an image on a substrate, comprises depositing ink compositions of at least two colors onto the substrate to form the image, and fixing the image to the substrate, wherein the ink is deposited using an electrostatic printhead, which ejects chargeable marking particles dispersed in a carrier fluid by using an applied electric field to first concentrate and then eject the marking particles, and wherein all of the ink compositions are deposited onto the substrate before the image is fixed. An ink composition suitable for use in the invention comprises: 45-95% by weight of a carrier liquid; 6-40% by weight of insoluble chargeable marking particles; and 0.4-10% by weight of a soluble dispersant, characterized in that the ink does not contain an agent that can fix the marking particles to a substrate.

9 Claims, 4 Drawing Sheets

(56) References Cited

U.S. PATENT DOCUMENTS

| | | |
|---|---|---|
| 2004/0259015 A1 | 12/2004 | Tsubuko et al. |
| 2005/0062787 A1* | 3/2005 | Furukawa ................ 347/20 |
| 2006/0075917 A1* | 4/2006 | Edwards ................ 101/483 |
| 2006/0198964 A1* | 9/2006 | Kaiser ................ 427/487 |
| 2007/0120923 A1 | 5/2007 | Kovacs et al. |

FOREIGN PATENT DOCUMENTS

| | | | |
|---|---|---|---|
| EP | 1927632 | A1 | 6/2008 |
| EP | 2017016 | A1 | 1/2009 |
| JP | 2003251908 | A | 9/2003 |
| JP | 2005-103958 | A | 4/2005 |
| JP | 2005-138503 | A | 6/2005 |
| JP | 20006315363 | A | 11/2006 |
| WO | 9311866 | | 6/1993 |
| WO | 9501404 | | 1/1995 |
| WO | 9727056 | | 7/1997 |
| WO | 9727058 | | 7/1997 |
| WO | 9832609 | | 7/1998 |
| WO | 0130576 | A1 | 5/2001 |
| WO | 03101741 | A2 | 12/2003 |
| WO | 2006/083000 | | 8/2006 |
| WO | 2011/021591 | | 2/2011 |

* cited by examiner

PRINTING PROCESS AND LIQUID INK JET INK

FIELD OF THE INVENTION

The present invention relates to decoration and image fixing processes, and inks for use therein.

BACKGROUND OF THE INVENTION

Printing techniques broadly fall into two categories. The first is traditional 'analogue' techniques such as offset, gravure, flexography or screen printing. In these techniques, a permanent impression of the image to be printed is formed on a printing plate, drum or screen by mechanical or lithographic means, to which ink is applied. The image is then transferred to the material to be printed. In colour printing, this process is repeated a number of times using a different plate, drum or screen and a different ink colour to lay down each colour separation of the image;

The second printing technique is 'digital' printing, whereby an image stored in computer memory is formed directly on the material to be printed by an electronically controlled system, without the need for permanent 'tooling'. Examples of digital print processes are dry powder electrophotography, liquid toner electrophotography, continuous ink jet (CIJ), thermal ink jet (TIJ) and piezoelectric drop-on-demand (DOD) ink jet.

In all cases, the printing of colour images involves the sequential application of at least two colour separations.

The printing of packaging materials is a significant part of the global printing market, and the vast majority of this makes use of traditional analogue techniques. However, there is a strong desire within the industry for the benefits offered by digital printing, such as economic short runs, fast response to market demands, affordable personalisation and customisation, reduced wastage and reduced inventory.

Many packaging materials are non-absorbent, typically having an outer surface of metal, plastic or varnish. In order to print onto these materials, existing print processes need to dry or fix each colour separation onto the substrate before putting down the subsequent colour separation, to avoid smudging and degradation of the image; in the case of traditional analogue methods, this would result from the physical contact of the equipment printing the subsequent colours, while in the case of non-contact methods like inkjet, the degradation arises from flow of ink on the non-absorbent substrate.

The need to dry or fix each colour separation before putting down the subsequent colour, adds complexity to the overall printing system. It can also lead to the final result falling outside the customer requirements, either because the fixing method is unable to give the required levels of adhesion (as is the case with thermally cured electrophotographic imaging) or because the chemicals used for fixing are not compatible with the food safety requirements of the end customers (as is the case with UV cured ink jet).

CIJ and TIJ printers use solvent or water-based inks. These processes are not able to create high quality images on non-absorbing substrates because the ink is not viscous, and is able to flow the substrate. Further, the coloured inks used in these small nozzlejet printers are based on soluble dyes, as insoluble pigment based inks can cause problems with nozzle blocking. Therefore the advantages of pigment formulations, namely better water, heat and light fastness, are precluded.

WO93/11866 describes an ink jet printing technology, in which droplets of variable size, containing a high concentration of particulate material, are produced. Specific advantages conveyed by this process include the ability to form droplets smaller than a picoliter while still using pigments as the colorant material. As the size of the droplets is controlled primarily by the voltage waveform applied to an ejection point, they are not limited by the size of an ink jet nozzle. Also, the colorant material is significantly concentrated in the ejected droplets. Therefore, high resolution and high density images based on light and water-resistant pigments can be produced.

WO95/01404 describes ink jet inks suitable for use in the process described in WO93/11866. All the ink compositions disclosed therein contain a binder, such as a synthetic resin.

U.S. Pat. No. 4,165,399 describes binder-less ink compositions suitable for use in ink jet operations. However, these ink composition are only suitable for use on synthetic polymeric resin surfaces (into which the ink composition can penetrate). They are not suitable for use on non-absorbent surfaces. All the ink compositions disclosed therein contain between 0.5 and 5.0 percent by weight of a dye.

SUMMARY OF THE INVENTION

The present invention addresses the problem of both simplifying the printing process, while still allowing high quality images to be formed, particularly on non-absorbent print surfaces. It has been found that this can be achieved by the use of a non-contact electrostatic printing process.

Therefore, according to a first aspect, the present invention is a process for forming an image on a substrate, comprising depositing ink compositions of at least two colours onto the substrate to form the image, and fixing the image on the substrate, wherein the ink is deposited using an electrostatic printhead, which ejects chargeable marking particles dispersed in a carrier fluid by using an applied electric field to first concentrate and then eject the marking particles, and wherein all of the ink compositions are deposited onto the substrate before the image is fixed.

It has also been found that binder-less inks containing a high pigment concentration are especially useful in a process of the invention, as they allow complete independence of the decoration and fixing processes.

Therefore, according to a second aspect of the present invention is an ink composition comprising:
  45-95% by weight of a carrier liquid;
  6-40% by weight of insoluble chargeable marking particles; and
  0.4-10% by weight of a soluble dispersant;
  characterised in that the ink does not contain an agent that can fix the marking particles to a substrate.

According to a third aspect, the present invention comprises an ink composition according to any of claims 6 to 9, consisting of:
  6-40% by weight of insoluble charging marking particles;
  0.4-10% by weight of a soluble dispersant;
  up to 2% by weight of a particle charging agent; and
  balance carrier liquid.

According to a fourth aspect, the present invention comprises a process for forming an image on a substrate, comprising depositing an ink composition as defined directly above onto the substrate, and fixing the ink composition onto the substrate.

DESCRIPTION OF THE PREFERRED EMBODIMENTS

As used herein, a chargeable marking particle is a material that changes the color of the light it reflects as the result of selective color absorption, i.e. a chargeable pigment, including complete absorption (black), and no absorption (white). The marking particle that is suitable for use in the invention is predominantly insoluble in the carrier liquid. Preferably, less than 1% of the marking particles are soluble in the carrier liquid. Examples of marking particles suitable for use in the invention are PB15:3 (cyan), PR57:1 (magenta), PY12 (yellow) and SB7 (black).

The dispersant is usually a material such as a polymer, an oligomer or a surfactant, which is added to the ink composition in comparatively small quantities (less than the quantity of pigment), in order to improve the dispersion of the marking particles. The dispersant is predominantly soluble in the carrier liquid. Preferably, it is an oligomer or a polymer. Examples of dispersants include Solsperse S17000 made by Lubrizol and Colorburst 2155.

As used herein, a "particle charging agent" is an agent that can dissociate into two or more charges species, one of which preferentially adsorbs onto the chargeable marking particles. Preferably, the particle charging agent is a metal salt or a polar solvent. Examples include "Nuxtra Zirconium 6%" from Huls America Inc. and "Octa-Soligen Zirconium 6" from OMG.

The carrier liquid used in the ink compositions of the invention is preferably a liquid having high electrical resistivity, i.e. insulating. Preferably, the resistivity is at least $10^9$ ohm·cm. A carrier liquid of the invention is preferably organic. Preferably, it is an aliphatic hydrocarbon, such as a $C_1$-$C_{20}$ alkane. More preferably, it is a branched $C_1$-$C_{20}$ alkane. Such liquids include Isopar G, hexane, cyclohexane and iso-decane.

The compositions of the invention are characterised in that they do not contain a binder, i.e. an agent that can fix chargeable marking particles to a substrate. A binder is usually a polymer or resin, which is added to an ink composition usually in comparatively large quantities (greater than the quantity of pigment) to adhere the pigment to the substrate via a subsequent curing process. A binder is usually a polymer or resin that can be cross-linked after printing, such as epoxy resins, acrylic resins such as polymers and copolymers of acrylic acid and esters thereof, polymers and copolymers of methacrylic acid and esters thereof, vinyl resins such as polymers and copolymers including vinyl acetate, vinyl chloride and vinyl alcohol, and alkyl resins.

In one aspect, the present invention is a process for forming an image on a substrate, comprising depositing ink compositions of at least two colours onto the substrate to form the image, and fixing the image on the substrate, wherein the ink is deposited using an electrostatic printhead, which ejects chargeable marking particles dispersed in a carrier fluid by using an applied electric field to first concentrate and then eject the marking particles, and wherein all of the ink compositions are deposited onto the substrate before the image is fixed.

Preferably, each ink composition comprises at least 6% by weight of chargeable marking particles. More preferably, it comprises 6% to 40% by weight of marking particles. More preferably, it comprises 6% to 25% or 8% to 25% by weight of marking particles. Preferably, each ink composition does not contain an agent that can fix the chargeable marking particles to the substrate (a binder). Preferably, the ink composition comprises a particle charging agent.

A process of the invention allows for the deposition of very small amounts of pigment (chargeable particles). This results in a very thin, concentrated layer of pigment, and it is therefore possible to lay down the successive colour separations without explicitly fixing each separation to the substrate. The concentrated pigment deposition ensures that bleeding and smudging of the inks is prevented. Any residual carrier liquid in the image is then drawn-off to leave an image consisting of a thin, porous layer of pigment on the substrate.

Electrostatic printers suitable for use in the invention eject charged solid particles dispersed in a chemically inert, insulating carrier fluid by using an applied electric field to first concentrate and then eject the solid particles. Concentration occurs because the applied electric field causes electrophoresis and the charged particles move in the electric field towards the substrate until they encounter the surface of the ink. Ejection occurs when the applied electric field creates an electrophoretic force that is large enough to overcome the surface tension. The electric field is generated by creating a potential difference between the ejection location and the substrate; this is achieved by applying voltages to electrodes at and/or surrounding the ejection location.

The location from which ejection occurs is determined by the printhead geometry and the location and shape of the electrodes that create the electric field. Typically, a printhead consists of one or more protrusions from the body of the printhead and these protrusions (also known as ejection upstands) have electrodes on their surface. The polarity of the bias applied to the electrodes is the same as the polarity of the charged particle so that the direction of the electrophoretic force is towards the substrate. Further, the overall geometry of the printhead structure and the position of the electrodes are designed such that concentration and then ejection occurs at a highly localised region around the tip of the protrusions.

To operate reliably, the ink must flow past the ejection location continuously in order to replenish the particles that have been ejected. To enable this flow the ink must be of a low viscosity, typically a few centipoises. The material that is ejected is more viscous because of the concentration of particles; as a result, the technology can be used to print onto non-absorbing substrates because the material will not flow significantly after impact.

Various printhead designs have been described in the prior art, such as those in WO93/11866, WO97/27058, WO97/27056, WO98/32609, WO01/30576 and WO03/101741. Printheads of this type are particularly preferred for use in the invention.

Figure 1:
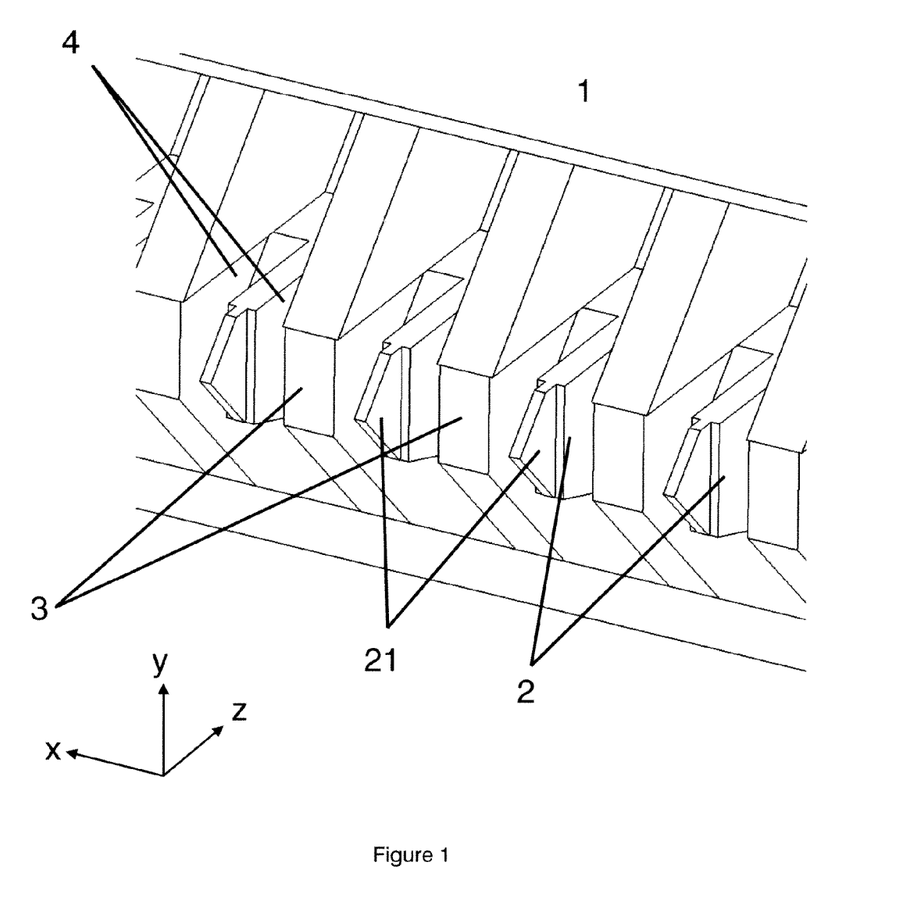
FIG. 1 is a side-view showing the region of an electrostatic printhead that can be used in a process of the invention.

FIG. 1 is a drawing of the tip region of an electrostatic printhead 1 of the type described in this prior art, showing several ejection upstands 2 each with a tip 21. Between each ejection upstand is a wall 3, also called a cheek, which defines the boundary of each ejection cell. In each cell, ink flows in the two channels 4, one on each side of the ejection upstand 2 and in use the ink meniscus is pinned between the top of the cheeks and the top of the ejection upstand. In this geometry the positive direction of the z-axis is defined as pointing from the substrate towards the printhead, the x-axis points along the line of the tips of the ejection upstands and the y-axis is perpendicular to these.

Figure 2:
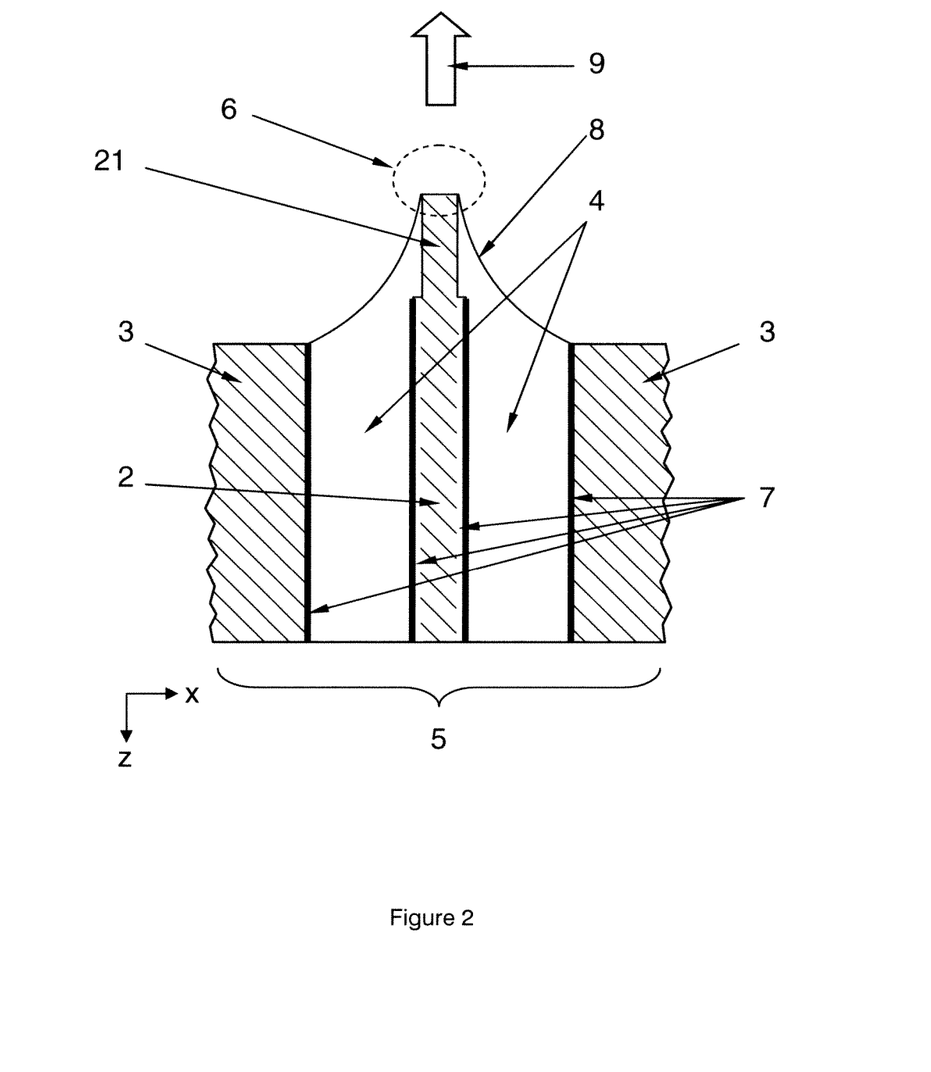
FIG. 2 is a schematic diagram in the x-z plane of the printhead shown in FIG. 1.

FIG. 2 is a schematic diagram in the x-z plane of a single ejection cell 5 in the same printhead 1, looking along the y-axis taking a slice through the middle of the tips of the upstands 2. This figure shows the cheeks 3, the ejection upstand 2, the ejection location 6, the location of the ejection electrodes 7 and the position of the ink meniscus 8. The solid arrow 9 shows the ejection direction and also points towards the substrate. Typically, the pitch between the ejection cells is 168 µm. In the example shown in FIG. 2 the ink usually flows into the page, away from the reader.

Figure 3:
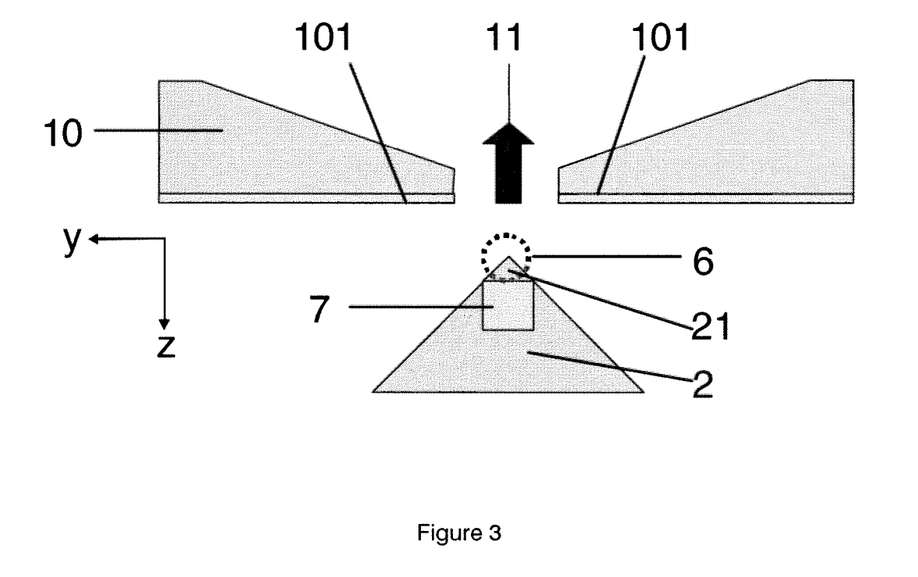
FIG. 3 is a schematic diagram in the y-z plane of the printhead shown in FIG. 1.

FIG. 3 is a schematic diagram of the same printhead 1 in the y-z plane showing a side-on view of an ejection upstand along the x-axis. This figure shows the ejection upstand 2, the location of the electrode 7 on the upstand and a component known as an intermediate electrode (10). The intermediate electrode 10 is a structure that has electrodes 101, on its inner face (and sometimes over its entire surface), that in use are biased to a different potential from that of the ejection electrodes 7 on the ejection upstands 2. The intermediate electrode 10 may be patterned so that each ejection upstand 2 has an electrode facing it that can be individually addressed, or it can be uniformly metallised such that the whole surface of the intermediate electrode 10 is held at a constant bias. The intermediate electrode 10 acts as an electrostatic shield by screening the ejection location from external electric fields and allows the electric field at the ejection location 6 to be carefully controlled.

The solid arrow 11 shows the ejection direction and again points in the direction of the substrate. In FIG. 3 the ink usually flows from left to right.

In operation, it is usual to hold the substrate at ground (0 V), and apply a voltage, $V_{IE}$, between the intermediate electrode 10 and the substrate. A further potential difference of $V_B$ is applied between the intermediate electrode 10 and the electrodes 7 on the ejection upstand 2 and the cheeks 3, such that the potential of these electrodes is $V_{IE}+V_B$. The magnitude of $V_B$ is chosen such that an electric field is generated at the ejection location 6 that concentrates the particles, but does not eject the particles. Ejection spontaneously occurs at applied biases of $V_B$ above a certain threshold voltage, $V_S$, corresponding to the electric field strength at which the electrophoretic force on the particles exactly balances the surface tension of the ink. It is therefore always the case that $V_B$ is selected to be less than $V_S$. Upon application of $V_B$, the ink meniscus moves forwards to cover more of the ejection upstand 2. To eject the concentrated particles, a further voltage pulse of amplitude $V_P$ is applied to the ejection upstand 2, such that the potential difference between the ejection upstand 2 and the intermediate electrode 10 is $V_B+V_P$. Ejection will continue for the duration of the voltage pulse. Typical values for these biases are $V_{IE}$=500 volts, $V_B$=1000 V and $V_P$=300 volts.

One of the advantages of electrostatic printers of this type is that greyscale printing can be achieved by modulating either the duration or the amplitude of the voltage pulse. The voltage pulses may be generated such that the amplitude of individual pulses are derived from the bitmap data, or such that the pulse duration is derived from the bitmap data, or using a combination of both techniques.

Electrostatic printers of the type described herein eject more viscous jets of particulate material from a less viscous carrier fluid. This offers many advantages over conventional digital printers based on piezoelectric or thermal technology including substrate independence, i.e. the ability to print onto absorbing and non-absorbing substrates without material spreading after impact, smaller dot diameters, improved dot formation (leading to a reduced number of satellite droplets), greyscale printing and compatibility with a wide range of materials.

Another advantage of the electrostatic printers described herein is increased reliability. This may be due to the fact that there are no moving parts or that there is a very open structure (no small nozzles), which results in fewer blockages. Further, recirculating ink helps keep ink channels clear and particles suspended. These electrostatic printers are also low cost, as the uncomplicated printhead structure can be made using simple manufacturing techniques Printheads comprising any number of ejectors can be constructed for use in the invention by fabricating numerous cells 5, of the type shown in FIGS. 1 to 3, side-by-side along the x-axis. A controlling computer converts image data (bit-mapped pixel values) stored in its memory into voltage waveforms (commonly digital square pulses) that are supplied to each channel individually. By moving the printhead 1 relative to the substrate in a controllable manner, large area images can be printed onto the substrate.

Figure 4:
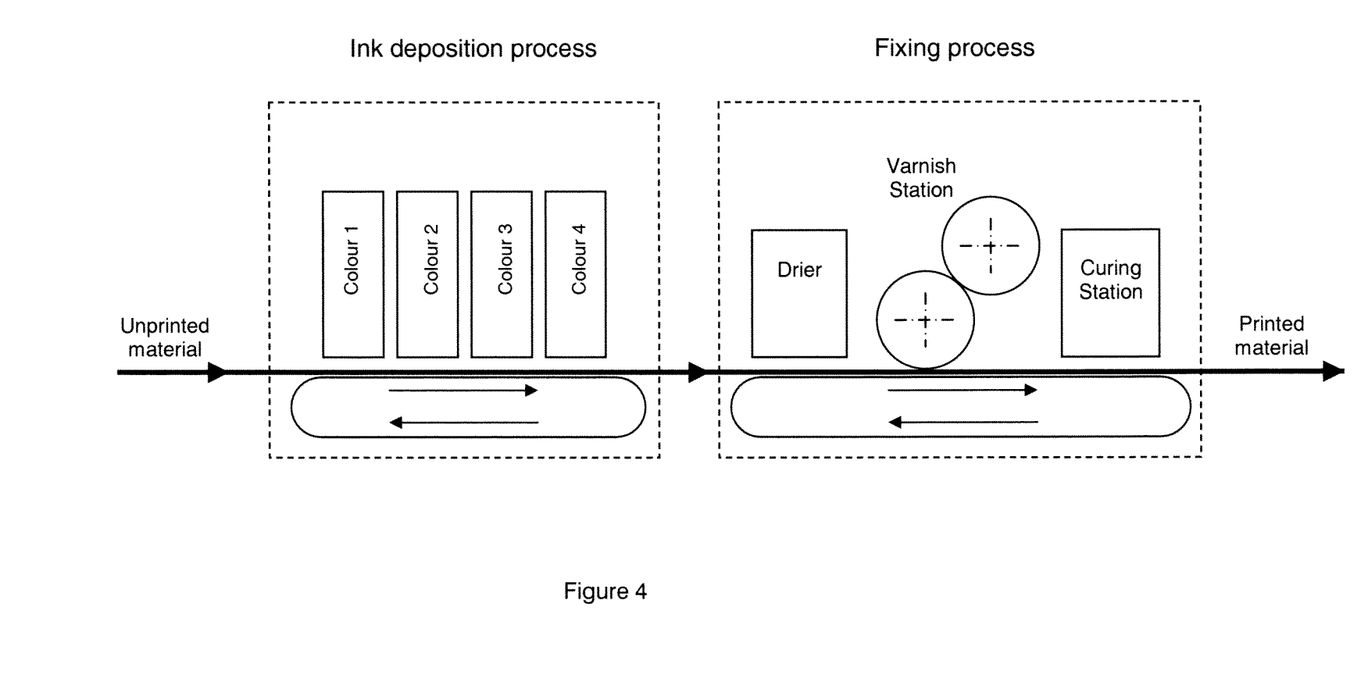
FIG. 4 is a schematic diagram showing one example of the printing process according to the present invention, illustrating the separation of the ink deposition process and the fixing process.

In a second stage of a process of the invention, a layer of pigment (marking particles) is fixed to a substrate. In a preferred embodiment, the layer of pigment is coated with a varnish, for example: Hyperion Technology Varnish (product code 12104 XWH water-based varnish from Sun Chemical), or a varnish comprising styrene-acrylic based copolymer dispersed in slightly alkaline water, which is then cured. The varnish can be put down by a contact or non-contact process and the curing system for the varnish may be via carrier evaporation or a thermal, chemical, UV or electron-beam cure as appropriate for the chosen varnish. Further examples of suitable varnishes are: PPG8241-801/B and Valspar 2228005 thermal curing varnishes for metal; SunCure 15HC146 or 13HC143 UV-curing over-print varnish from Sun Chemical; Sunprop RB600 solvent-based lacquer also from Sun Chemical. An overview of one embodiment of the invention, showing fixing by applying a varnish, is shown in FIG. 4.

In a preferred embodiment, the surface of the substrate is pre-coated with a basecoat material before printing, the basecoat being in an uncured or partially cured state when the layers of pigment are deposited onto it by the printheads. The pigments are then fixed to the substrate by curing the basecoat using a method suitable for the chosen basecoat, after all the pigments have been deposited.

Preferably, a process of the invention includes printing onto a non-absorbent substrate. Preferably, the term "non-absorbent" means that the substrate takes up less than 50% of the applied carrier liquid.

By separating the decoration and image fixing process it becomes simpler to make inks that meet low-toxicity food packaging requirements. This is because it is no longer necessary to incorporate binders that must meet the different requirements of the ink chemistry, the print process, the substrate and food packaging legislation, into the formulations. Furthermore, it is possible to have a single image fixing process that is independent of the decoration process. This image fixing process can be specifically designed to be compatible with the substrate, packaging process and overall customer requirements, such as robustness and food safety, and thus deliver a practical, economic solution that meets the engineering demands at a price that is compatible with mass market use.

Other advantages of the invention are the attainment of a higher print speed due to the high pigment loading that is possible in the inks in the absence of other solids, thus achieving the required coverage of pigment on the printed substrate with a smaller volume of ink ejected. Furthermore, the dry ink thickness can be very thin (less than 1 micron) as it consists almost totally of pigment, and therefore there is no visible surface relief or texture that results from the printing process.

As the process requires such a small volume of ink, the time and energy required to dry the wet ink before varnishing is reduced. The small volume of ink required means there is less solvent involved in the printing process and less solvent to be evaporated or recycled.

By removing the binder from the ink, reliability of the printhead and associated fluid handling system is improved, as the ink does not contain materials that would tend to adhere to internal surfaces, filter meshes, etc.

The invention also ensures a uniform finish (in terms of gloss, etc.), as the varnish can be applied to both the printed and unprinted areas of material, enhancing its visual appearance compared with a printing method where the inks and substrate have different visual properties.

The invention will now be illustrated by the following Examples.

Example 1

Yellow, magenta, cyan and black inks were prepared for use in the invention. The formula for the magenta ink was as follows:

| Pigment | PR 57:1 Permanent Rubine from Clariant | 100 g |
| Dispersant | Solsperse S17000 | 6 g |
| Carrier liquid | Isopar G | to 500 g |

The above ingredients were bead-milled together for 2 hours. 300 g of the resultant mixture was mixed with a further 448 g of isopar G and 1.9 g particle charging agent (Nuxtra Zirconium 6%), to produce an ink having the following proportions:

8.00% by weight of pigment (i.e. insoluble chargeable marking particles);
0.48% by weight of a dispersant;
0.25% by weight of particle charging agent; and
91.27% by weight of a carrier liquid.

The other three inks were prepared by a similar method.

The four inks were printed sequentially from four printheads of the type described in WO93/11866, WO97/27058, WO97/27056, WO98/32609, WO01/30576 and WO03/101741, onto a white base-coated metal substrate moving at a speed of 1 m/s relative to the printheads. The width of each printhead was 172 mm and the width of the print formed on the substrate from the printheads was 160 mm. The image was a four-colour design incorporating text, graphics and photographic elements and having a resolution of 600 pixels per inch.

Each colour separation was formed from four passes of the substrate under the printhead, which had an ejector spacing of 150 ejectors per inch, the four passes taking a total of 0.8 seconds, with a time interval of 0.2 seconds between finishing the printing of one colour and starting the printing of the next.

Immediately following printing of the final colour, the printed substrate was dried using a combination of heating and airflow for one second (to evaporate residual carrier liquid from the print). Immediately following this, a thermally-curing, water-based varnish was applied to the printed substrate using an anilox roller, and cured by heating to 200° C. for five minutes. This gave a high level of fix, gloss and chemical and abrasion resistance to the printed material.

The print achieved the following optical densities:

| Cyan | 1.3 ODU |
| Magenta | 1.3 ODU |
| Yellow | 0.9 ODU |
| Black | 2.2 ODU |

Additional properties of the finished print were:
Food safety: meets SBPIM codes for printing inks on food wrappers.
Durability: meets requirements demanded by the beverage can industry for scratch, chemical and heat resistance and necking and flanging of cans.

Example 2

Using the same inks as Example 1, the four inks were printed sequentially from four printheads of the type described in WO93/11866, WO97/27058, WO97/27056, WO98/32609, WO01/30576 and WO03/101741, onto a clear, 12 micron thick, PET (polyethylene terephthalate) film. The PET film, measuring approximately 200 mm by 300 mm, was mounted on a flat, horizontal, metal platen positioned approximately 0.5 mm beneath the printheads. The platen was controlled to move relative to the printheads repeatedly to and fro at a speed of 0.8 meters per second in a direction perpendicular to the printhead arrays.

The image to be printed was a 600 dot-per-inch, colour design incorporating text, graphics and photographic images, measuring 100 mm by 160 mm.

Each printhead was 100 mm wide and had an ejector spacing of 168 microns, such that four passes of the substrate beneath a given printhead created a 600 dot-per-inch, single colour separation of the printed image, each pass being offset by 42 microns from the previous pass. To achieve this, one printhead at a time was controlled to print during each forward motion of the platen and, on each return pass of the platen, the printhead was controlled to move perpendicular to the substrate motion by a distance of 42 microns.

The colour image was printed onto the PET film by printing each of the four colour separations in the manner described above, sequentially, with a period of 30 seconds between the printing of each colour separation to allow the residual carrier liquid in the print to evaporate. Each colour separation took approximately 4 seconds to print, and there was no intermediate fixing between colours. Once all four colours had been printed, the printed image was fixed using Lukas Spray Film Gloss, number 2321, solvent based acrylic resin and allowed to air-dry. The resultant print on the PET film was near photographic quality with a high level of fix, gloss and chemical and abrasion resistance.

The invention claimed is:
1. An ink composition comprising:
45-95% by weight of a carrier liquid;
6-40% by weight of insoluble chargeable marking particles; and
0.4-10% by weight of a soluble dispersant;
characterised in that the ink does not contain a binder that can fix the marking particles to a substrate.
2. An ink composition according to claim 1, further comprising up to 2% by weight of a particle charging agent.
3. An ink composition according to claim 2, wherein the particle charging agent is present in an amount of less than 0.5% by weight.

4. An ink composition according to claim 1, wherein the insoluble chargeable marking particles are present in an amount of 8-25% by weight.

5. An ink composition according to claim 1, further comprising:
   6-40% by weight of insoluble charging marking particles;
   0.4-10% by weight of a soluble dispersant;
   up to 2% by weight of a particle charging agent; and
   balance carrier liquid.

6. A process for forming an image on a substrate, comprising depositing an ink composition according to claim 1 onto the substrate, and fixing the ink composition onto the substrate.

7. A process for forming an image on a substrate, comprising depositing ink compositions of at least two colours onto the substrate to form the image, and fixing the image to the substrate, wherein the ink is deposited using an electrostatic printhead, which ejects chargeable marking particles dispersed in a carrier fluid by using an applied electric field to first concentrate and then eject the marking particles, and wherein all of the ink compositions are deposited onto the substrate before the image is fixed, wherein the ink composition comprises:
   45-95% by weight of a carrier liquid;
   6-40% by weight of insoluble chargeable marking particles; and
   0.4-10% by weight of a soluble dispersant.

8. A method of forming an image on a substrate by depositing the ink composition of claim 1 onto the substrate.

9. A method according to claim 7, wherein the substrate is non-absorbent.

* * * * *